United States Patent
Baek et al.

(10) Patent No.: US 10,205,489 B2
(45) Date of Patent: Feb. 12, 2019

(54) REAR COVER AND PORTABLE TERMINAL HAVING SAME

(71) Applicant: AMOTECH CO., LTD., Incheon (KR)

(72) Inventors: Hyungil Baek, Gyeonggi-do (KR); Jinwon Noh, Gyeonggi-do (KR); Kisang Lim, Incheon (KR); Dohyung Lee, Incheon (KR); Chiho Lee, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 0 days.

(21) Appl. No.: 15/027,413

(22) PCT Filed: Oct. 7, 2014

(86) PCT No.: PCT/KR2014/009438
§ 371 (c)(1),
(2) Date: Apr. 5, 2016

(87) PCT Pub. No.: WO2015/053535
PCT Pub. Date: Apr. 16, 2015

(65) Prior Publication Data
US 2016/0285520 A1 Sep. 29, 2016

(30) Foreign Application Priority Data

Oct. 7, 2013 (KR) ............ 10-2013-0119263
Oct. 14, 2013 (KR) ............ 10-2013-0121718
Oct. 14, 2013 (KR) ............ 10-2013-0121719

(51) Int. Cl.
*H01Q 1/24* (2006.01)
*H01Q 7/06* (2006.01)
(Continued)

(52) U.S. Cl.
CPC ............ *H04B 5/02* (2013.01); *H01Q 1/243* (2013.01); *H01Q 7/06* (2013.01); *H01Q 13/10* (2013.01);
(Continued)

(58) Field of Classification Search
CPC ...... H04B 5/02; H04B 5/0056; H04B 1/3888; H01Q 1/243; H01Q 7/06; H01Q 13/10
See application file for complete search history.

(56) References Cited

U.S. PATENT DOCUMENTS 8,439,191 B1* 5/2013 Lu .................. H04B 1/3888
206/320
8,610,629 B2 12/2013 Pascolini et al.
(Continued)

FOREIGN PATENT DOCUMENTS

CN 102142855 8/2011
CN 102405556 4/2012
(Continued)

OTHER PUBLICATIONS

Machine translation of KR101291044.*

*Primary Examiner* — David Orange
(74) *Attorney, Agent, or Firm* — Wells St. John P.S.

(57) ABSTRACT

Provided are a rear cover of a portable terminal, which is formed from a metallic material and is capable of operating as an auxiliary radiator of a near-field communication antenna pattern by forming slits thereon, and a portable terminal having the same. The provided rear cover is formed from a metallic material, has a slit part, allows a near-field communication antenna and the slit part to form an overlapping area when the rear cover is mounted on the rear surface of the portable terminal, and operates as the auxiliary radiator of the near-field communication antenna through the coupling of the near-field communication antenna and the slit part in the overlapping area.

3 Claims, 17 Drawing Sheets

(51) Int. Cl.
*H04B 5/00* (2006.01)
*H04B 5/02* (2006.01)
*H01Q 13/10* (2006.01)
*H04B 1/3888* (2015.01)

(52) U.S. Cl.
CPC ......... *H04B 1/3888* (2013.01); *H04B 5/0056* (2013.01)

(56) References Cited

U.S. PATENT DOCUMENTS

| | | | |
|---|---|---|---|
| 2009/0231215 A1* | 9/2009 | Taura | H01Q 1/243 343/702 |
| 2010/0096284 A1* | 4/2010 | Bau | H04B 1/3888 206/320 |
| 2012/0329531 A1 | 12/2012 | Park et al. | |
| 2014/0009358 A1 | 1/2014 | Yang et al. | |
| 2016/0020516 A1* | 1/2016 | Jung | H01Q 1/42 343/702 |

FOREIGN PATENT DOCUMENTS

| | | |
|---|---|---|
| CN | 102948015 | 3/2013 |
| JP | WO2010/0122685 | 10/2012 |
| KR | 10-2011-0124131 | 11/2011 |
| KR | 10-2012-0140373 | 12/2012 |
| KR | 10-2013-0040891 | 4/2013 |
| KR | 10-2013-0045307 | 5/2013 |
| KR | 10-2013-0085117 | 7/2013 |
| KR | 10-2013-0088981 | 8/2013 |
| KR | 10-1291044 | 8/2013 |
| WO | WO 2012/128601 A2 | 9/2012 |

* cited by examiner

REAR COVER AND PORTABLE TERMINAL HAVING SAME

CROSS REFERENCE TO RELATED APPLICATION

This is a 35 U.S.C. § 371 application of, and claims priority to, International Application No. PCT/KR2014/009438, which was filed on Oct. 7, 2014, and which claims priority to Korean Patent Application No. 10-2013-0119263, which was filed on Oct. 7, 2013, and which claims priority to Korean Patent Application No. 10-2013-0121718 and Korean Patent Application No. 10-2013-0121719, which were both filed on Oct. 14, 2013, the teachings of ail the applications are incorporated herein by reference.

TECHNICAL FIELD

The present invention relates generally to a rear cover and a portable terminal having the rear cover and, more particularly, to a rear cover of a portable terminal equipped with an antenna that is installed in the portable terminal to provide near-field communication, and to a portable terminal having the rear cover.

This application claims the benefit of Korean Patent Application No. 10-2013-0119263, filed Oct. 7, 2013, and the benefit of Korean Patent Application Nos. 10-2013-0121718 and 10-2013-0121719, filed Oct. 14, 2013, which are hereby incorporated by reference in their entirety into this application.

BACKGROUND ART

With the development of technology, portable terminals such as a mobile is phone, a PDA, a PMP, navigation, or a laptop computer further provide a DMB function, a wireless internet function, and a near-field-communication function between devices, in addition to a basic function such as a call function, a video/audio playing function, or a navigation function. Thus, the portable terminal has a plurality of antennas for radio communications, such as wireless internet or Bluetooth.

Recently, there is a tendency to apply an information interchange function between terminals, a payment function, a ticket reservation function, or a search function using near-field communication (i.e., NFC) to the portable terminal. To this end, an antenna module (i.e., NFC antenna module) for the portable terminal used in a near-field-communication method is mounted on the portable terminal. The used NFC antenna module is a kind of an electronic tag (RFID), is a non-contact near-field-communication module that uses a frequency band of about 13.56 Hz, and transmits data between terminals at a near distance of 10 cm. NFC is widely used for payment, transmission of article information in a supermarket or a general shop and travel information for visitors, a locking device for transportation or access control, etc.

The NFC antenna module is formed in a planar shape and then is mounted on a battery pack, a rear cover (or back cover), etc. By way of example, as illustrated in FIG. 1, the conventional NFC antenna module includes a shielding sheet 24 (e.g., metal plate such as a ferrite sheet) layered on a battery 22 of a portable terminal 10 and a radiator pattern 26 layered on the shielding sheet 24, and is mounted in a battery pack 20 of the portable terminal 10. Of course, as illustrated in FIG. 2, the NFC antenna module may further include a radiation patch 28 that is formed inside the radiator pattern 26 to be spaced apart from the radiator pattern 26.

Generally, since the rear cover of the portable terminal is made of a polycarbonate material, it does not affect the communication of the NFC antenna mounted on the battery pack, the rear cover or the like.

However, a recent trend (e.g., grip sensation, design trend such as appearance) preferred by consumers has increased a demand for a metallic rear cover. In this case, an antenna signal may be shielded by a metallic material, so that it may be impossible to perform near-field communication.

DISCLOSURE

Technical Problem

Accordingly, the present invention has been made keeping in mind the above problems occurring in the prior art, and an object of the present invention is to provide a rear cover and a portable terminal having the rear cover, in which a slit is formed on the rear cover of the portable terminal made of a metallic material, so that the rear cover is operated as an auxiliary radiator of an antenna pattern for near-field communication.

Technical Solution

In order to accomplish the above object, the present invention provides a rear cover of a portable terminal including an antenna for near-field communication, wherein the rear cover may be made of a metallic material and may have a slit part formed thereon, and, when the rear cover may be mounted on a rear surface of the portable terminal, the antenna for near-field communication and the slit part may define an overlapping area.

The slit part may include a first slit extending from a first outer side of the rear cover towards a second outer side thereof; a second slit connected at a first end thereof to a first end of the first slit, and extending at a second end thereof towards the second outer side of the rear cover; a third slit extending from the second outer side of the rear cover towards the first outer side thereof; and a fourth slit connected at a first end thereof to the third slit, and extending at a second end thereof towards the first outer side of the rear cover. Here, the second end of the second slit and the second end of the fourth slit may be spaced apart from each other.

The slit part may further include a filth slit extending from a third outer side of the rear cover to a fourth outer side thereof.

The rear cover may be operated as an auxiliary radiator of the antenna for near-field communication through coupling between the slit part and the antenna for near field communication in the overlapping area.

The slit part may include a plurality of slits extending diagonally from a side of the rear cover. A first side of each of the slits may be connected to a side of the rear to cover, and a second side thereof may define the overlapping area together with the antenna for near-field communication. A first side of each of the slits may be connected to a side of the rear cover, and a second side thereof may be connected to another side of the rear cover.

The slit part may be formed in a shape of a polygon having both an inner circumference and an outer circumference. Thus, the rear cover may further include a first cover provided inside the inner circumference of the slit part; and a second cover provided outside the outer circumference of the slit part. A width of the slit part may be formed to be equal to or less than a width of an antenna pattern of the antenna for near-field communication.

The slit part may include a plurality of sub slits that are spaced apart from each other by a plurality of connecting parts, and the plurality of sub slits define the overlapping area together with the antenna for near-field communication.

The slit part may include a first sub slit forming the overlapping area together with a first side of the antenna pattern of the antenna for near-field communication; a second sub slit forming the overlapping area together with a second side of the antenna pattern of the antenna for near-field communication, a first end of the second sub slit being spaced apart from a first end of the first sub slit; a third sub slit forming the overlapping area together with a third side of the antenna pattern of the antenna for near-field communication, a first end of the third sub slit being spaced apart from a second end of the second sub slit; and a fourth sub slit forming the overlapping area together with a fourth side of the antenna pattern of the antenna for near-field communication, a first end of the fourth sub slit being spaced apart from a second end of the third sub slit and a second end of the fourth sub slit being spaced apart from a second end of the first sub slit.

The rear cover may include a first connecting part formed in an area where the first sub slit and the second sub slit are spaced apart from each other and connecting the first cover with the second cover; a second connecting part formed in an area where the second sub slit and the third sub slit are spaced apart from each other and connecting the first cover with the second cover; a third connecting part formed in an area where the third sub slit and the fourth sub slit are spaced apart from each other and connecting the first cover with the second cover; and a fourth connecting part formed in an area where the fourth sub slit and the first sub slit are spaced apart from each other and connecting the first cover with the second cover.

In order to accomplish the above object, the present invention provides a portable terminal, including a main body; a battery pack mounted in the main body of the portable terminal; a rear cover mounted on a rear surface of the main body of the portable terminal; and an antenna for near-field communication assembled with any one of the main body of the portable terminal, the battery pack and the rear cover, wherein the rear cover may be the above-described rear cover.

Advantageous Effects

As described above, the present invention provides a rear cover and a portable terminal having the rear cover, in which a slit is formed in the rear cover of the portable terminal made of a metallic material, so that the rear cover of the metallic material is operated as an auxiliary radiator of an antenna pattern for near-field communication, thus improving antenna properties.

MODE FOR INVENTION

Figure 1:
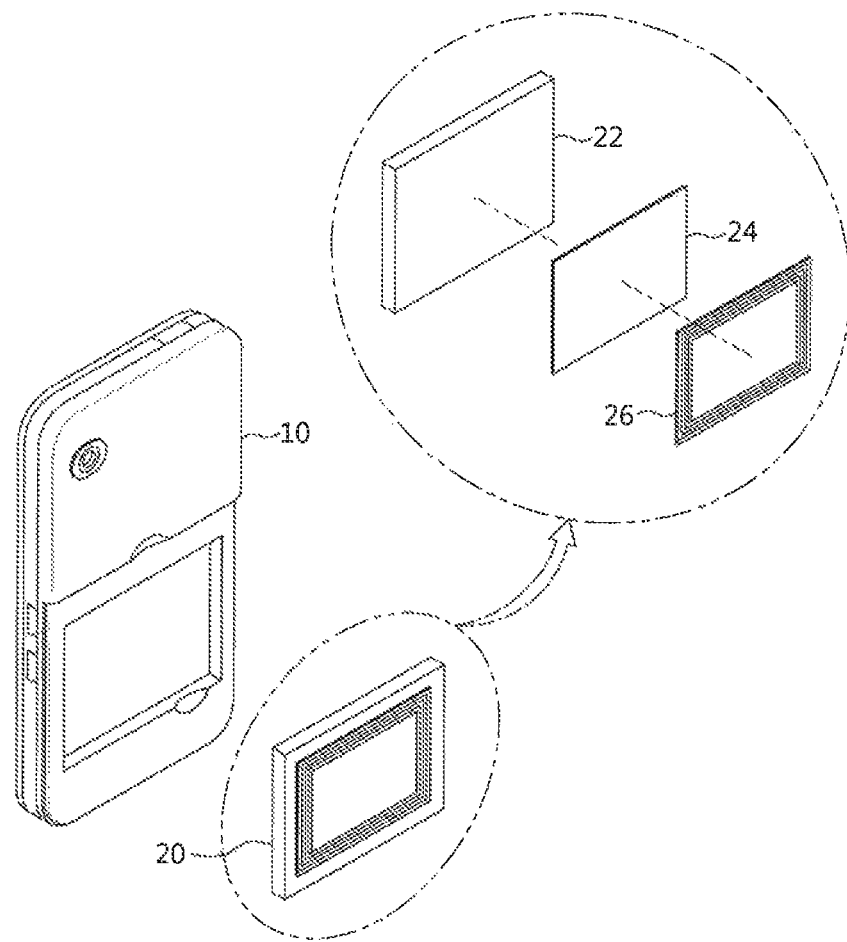
FIGS. 1 and 2 are views illustrating a conventional NFC antenna module.
Figure 2:
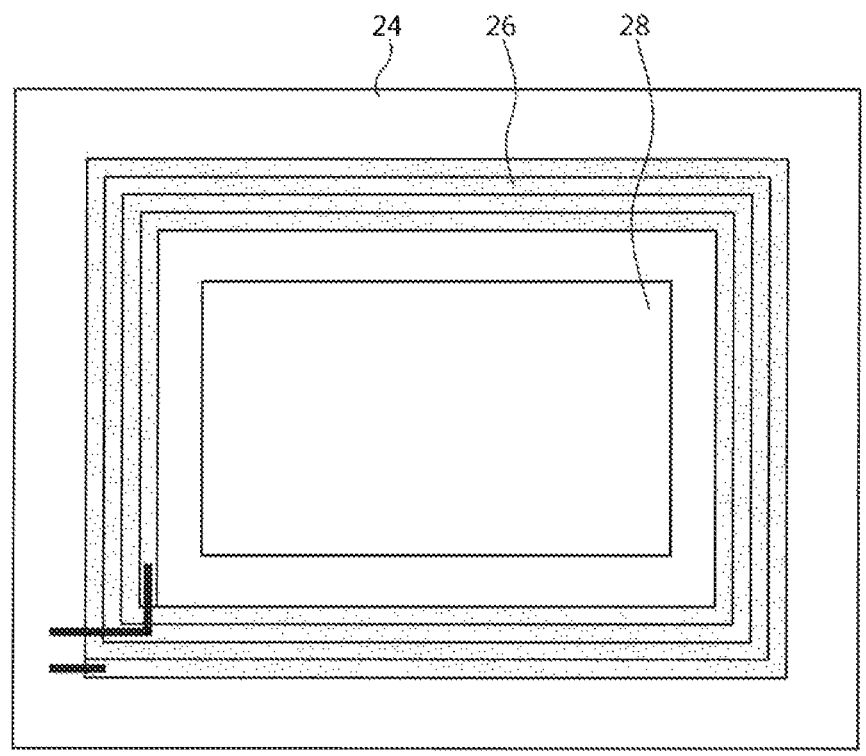

Hereinafter, the preferred embodiments of the present invention will be described with reference to the accompanying drawings to fully describe the present invention to a person having ordinary knowledge in the art to which the present invention pertains. The same reference numerals throughout the drawings denote elements having the same or similar function. In the following description of the present invention, detailed descriptions of known functions and components incorporated herein will be omitted when it may make the subject matter of the present invention unclear.

Hereinafter, antenna modules for portable terminals according to embodiments of the present invention will be described in detail with reference to the accompanying drawings. FIGS. 3 to 17 are views illustrating antenna modules for portable terminals according to embodiments of the present invention.

Figure 3:
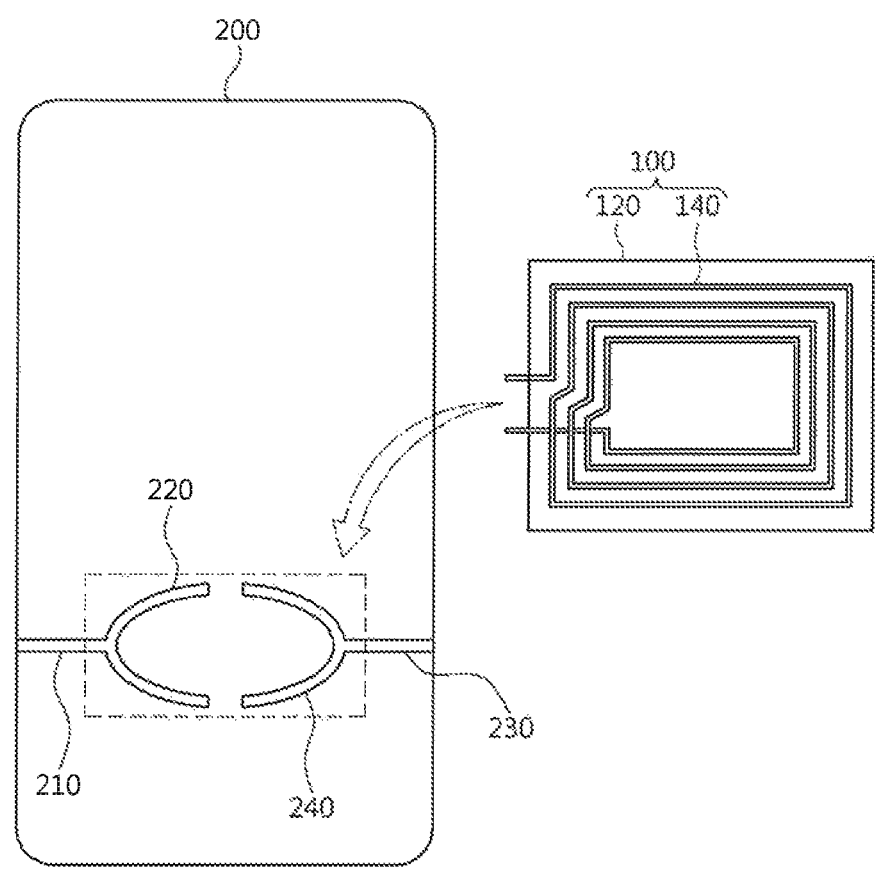
FIGS. 3 to 17 are views illustrating antenna modules for portable terminals according to embodiments of the present invention.

As illustrated in FIG. 3, the portable terminal includes an antenna 100 for near-field communication and a rear cover 200.

The antenna 100 for the near-field communication is mounted on a component (e.g., battery pack (not shown) or rear cover 200) of the portable terminal. The antenna 100 for the near-field communication includes a base sheet 120 and an antenna pattern 140.

The base sheet 120 is attached to the component of the portable terminal. That is, an antenna pattern 140 (e.g., NFC antenna pattern) is layered on an upper surface of the base sheet 120, and a lower surface of the base sheet 120 is coupled to the component of the portable terminal. The base sheet 120 is operated as a shielding sheet to perform shielding between the antenna pattern 140 and components of the portable terminal. The base sheet 120 is made of a material such as a ferrite sheet, a polymer sheet, a nanoribbon sheet, or an iron-based sheet.

The antenna pattern 140 is formed by printing a microline in the shape of a loop on an upper surface of a flexible circuit board. Of course, the antenna pattern 140 may be formed in the shape of a loop that is made by winding a wire several times in a central direction of the upper surface of the base sheet 120 along a circumference of the base sheet 120.

The rear cover 200 is made of a metallic material such as aluminum, with one or more slits formed on the rear cover. Here, the rear cover 200 has one or more slits on an area on which a portion having the strongest magnetic field in the antenna pattern 140 of the antenna 100 for near-field communication is mounted.

Hereinafter, various embodiments of the rear cover will be described with reference to FIGS. 4 to 17.

Figure 4:
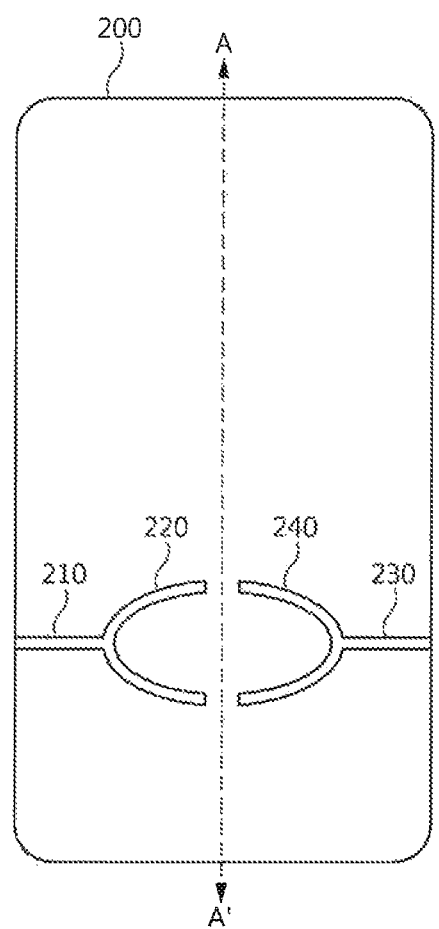
Figure 5:
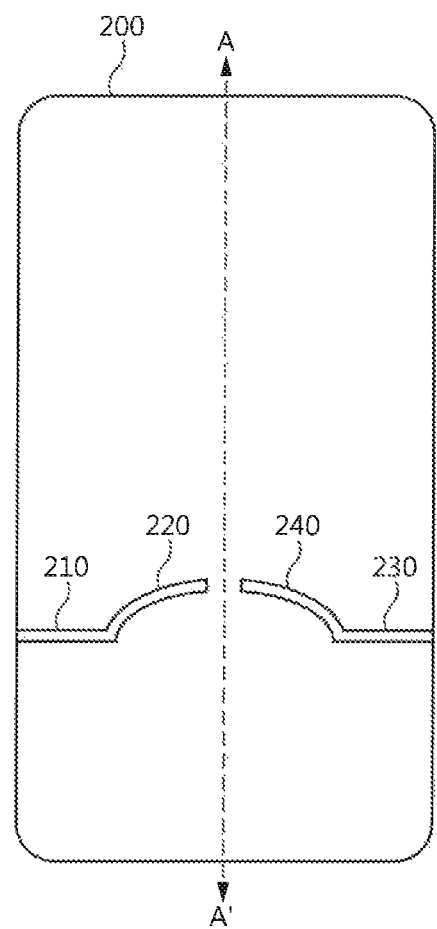
Figure 6:
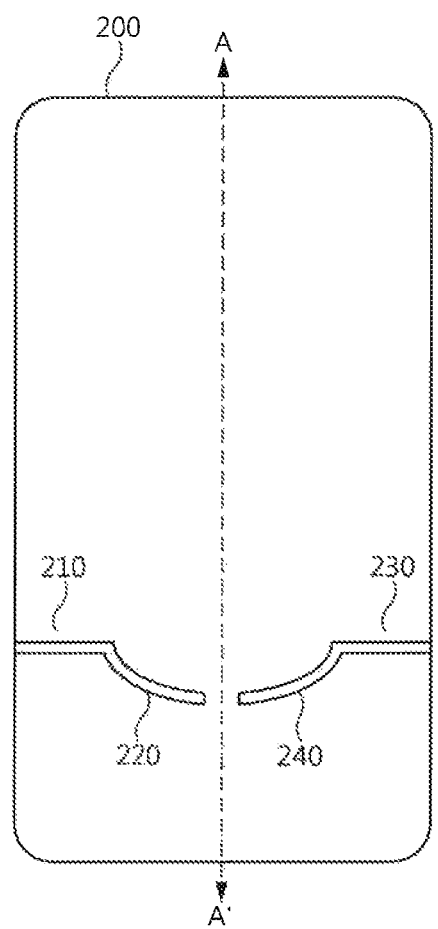
Figure 7:
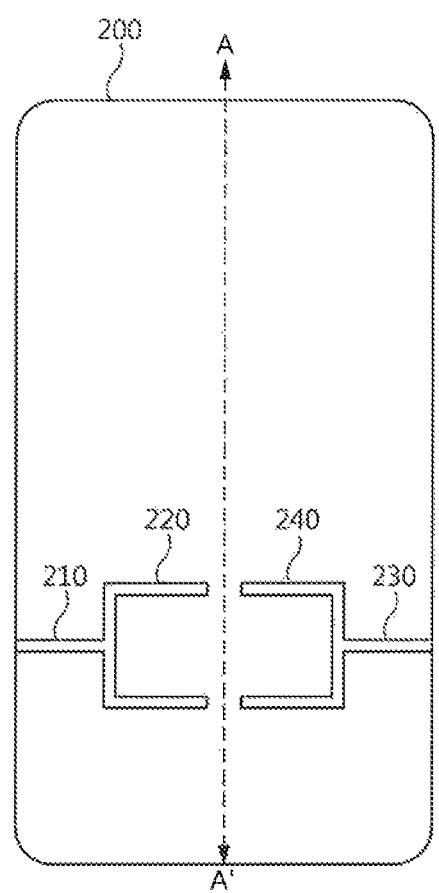
Figure 8:
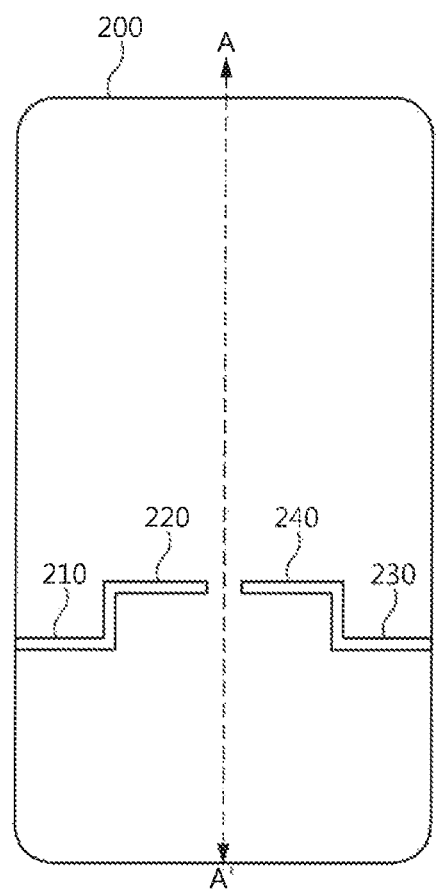
Figure 9:
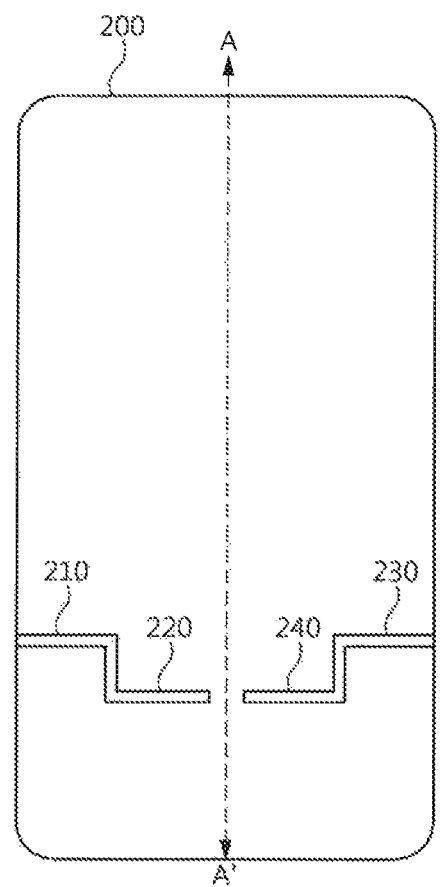
Figure 10:
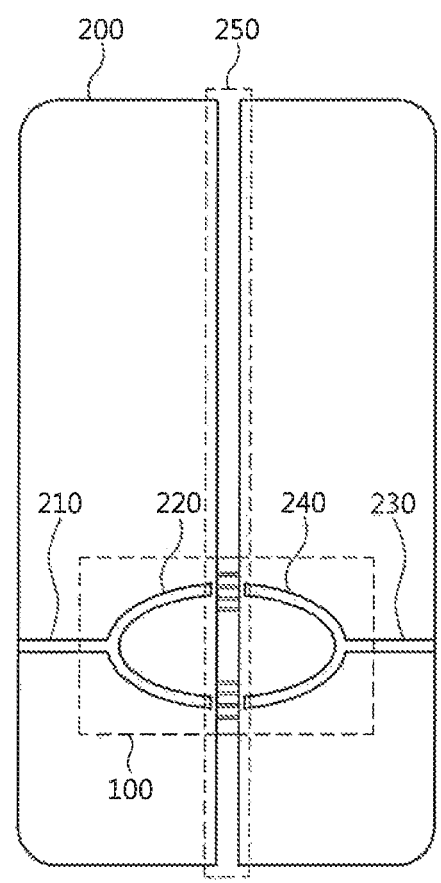

As illustrated in FIG. 4, a rear cover 200 according to a first embodiment includes a first slit 210, a second slit 220, a third slit 230, and a fourth slit 240. The first slit 210 is formed in a direction from a first outer side (i.e., left side) of the rear cover 200 to a central line (imaginary line A to A' of FIG. 4) located at an inner side. A side of the second slit 220 is connected to one end of the first slit 210, and the other end of the second slit extends towards the central line located at the inner side. Thus, the second slit 220 is formed in the shape of "⊂". The third slit 230 is formed in a direction from a second outer side (i.e., right side) of the rear cover 200 to the central line located at the inner side. A side of the fourth slit 240 is connected to one end of the third slit 230, and the other end of the fourth slit extends towards the central line located at the inner side. Thus, the fourth slit 240 is formed in the shape of "⊃". As illustrated in FIGS. 5 to 9, as the antenna 100 for near-field communication is formed, the second slit 220 and the fourth slit 240 may be formed in various shapes, including "⌒" shape, "⌐" shape, "⌎" shape, "⌏"shape, "⊏" shape, "⊐" shape, "¬" shape, and "∟" shape. Of course, as illustrated in FIG.

10, the rear cover 200 may further include a fifth slit 250 of a straight-line shape from a third outer side (i.e., upper side) of the rear cover 200 to a fourth outer side (i.e., lower side) thereof.

Figure 11:
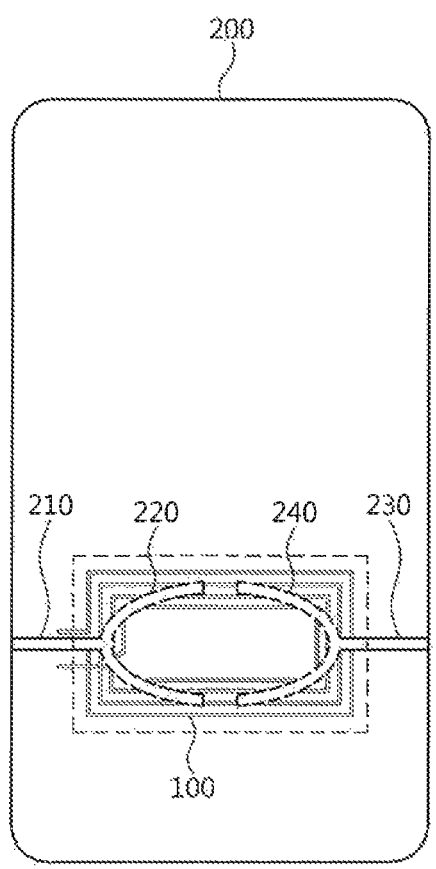

The rear cover 200 generates coupling in an area where the antenna 100 for near-field communication overlaps the slit and thereby acts as an auxiliary radiator of the antenna 100 for near-field communication. By way of example, as illustrated in FIG. 11, if the antenna 100 for near-field communication is mounted to overlap the slit formed in the rear cover 200, coupling occurs in an area where the antenna pattern 140 of the antenna 100 for near-field communication overlaps the slit. Thereby, the rear cover 200 made of a metallic material acts as the auxiliary radiator of the antenna 100 for near-field communication.

Figure 12:
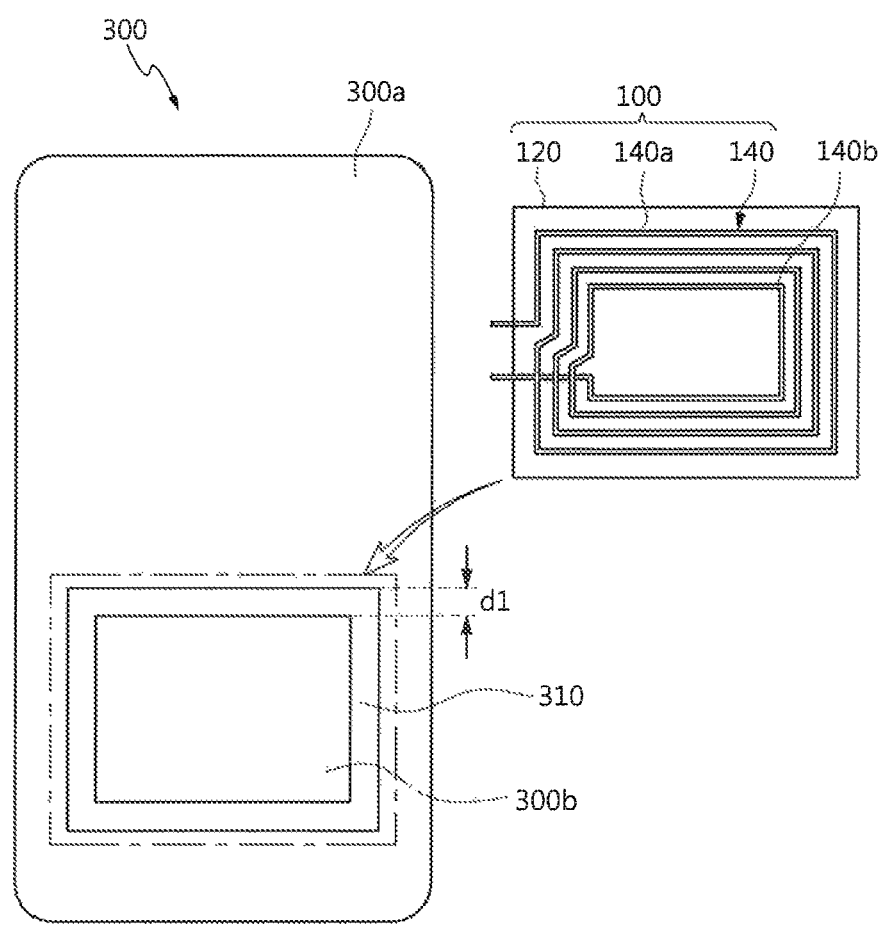

As illustrated in FIG. 12, a rear cover 300 according to a second embodiment is made of a metallic material such as aluminum, with one or more slit parts 310 formed thereon.

The slit part 310 is formed in the shape of a polygon having both an inner circumference and an outer circumference. That is, the slit part 310 is formed in the shape of the polygon having both the inner circumference and the outer circumference in conformity with the shape of the antenna pattern 140. By way of example, if the antenna pattern 140 is in the shape of a rectangular loop, the slit part 310 may be formed in a rectangular shape (i.e., "ロ" shape) having the inner circumference and the outer circumference. In addition, if the antenna pattern 140 is formed in a circular shape, the slit part 310 may be likewise formed in a circular shape (i.e., "○" shape). In this case, the slit part 310 may be formed to overlap the antenna pattern 140.

As the slit part 310 is formed, the rear cover 300 may be separated into a first cover 300b formed inside the inner circumference of the slit part 310 and a second cover 300a formed outside the outer circumference of the slit part 310. That is, the first cover 300a is a part that is located inside the slit part 310 to be surrounded by the slit part 310, and the second cover 300b is a part that is located outside the slit part 310 to surround the slit part 310.

Furthermore, a width d1 of the slit part 310 is formed to be equal to or less than a width of the antenna pattern 140, That is, the width d1 of the slit part 310 may be equal to or less than the shortest distance between a wire 140b of the antenna pattern 140 formed at the innermost position and a wire 140a thereof formed at the outermost position. The width d1 of the slit part 310 may be formed to be approximately 0.3 mm or more and 4 mm or less. The antenna pattern 140 may be partially or entirely exposed through the slit part 310.

Figure 13:
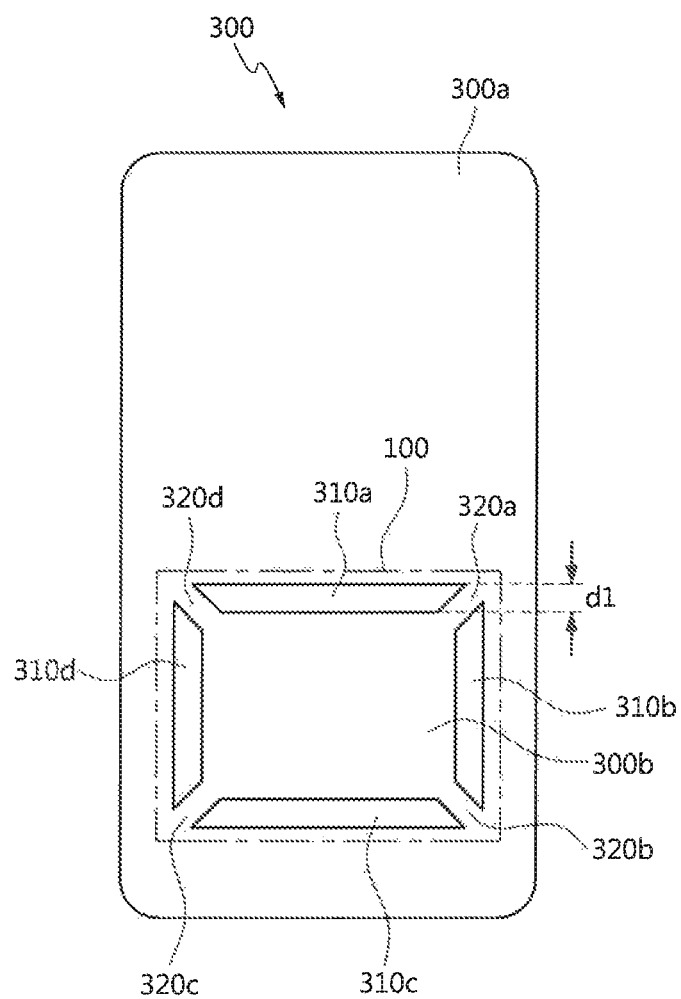

Meanwhile, as illustrated in FIG. 13, the rear cover 300 may have a slit part 310 including a plurality of sub slits 310a to 310d. Here, the respective sub slits 310a to 310d may be formed depending on the shape of the antenna pattern 140. The respective sub slits 310a to 310d are formed to be spaced apart from other sub slits 310a to 310d, and may overlap the antenna pattern 140 to define an overlapping area.

The respective sub slits 310a to 310d are formed to surround the second cover 300b. Thus, the second cover 300b may be a part of the rear cover 300 that is surrounded by the respective sub slits 310a to 310d, while the first cover 300a may be a part of the rear cover 300 that is not surrounded by the respective sub slits 310a to 310d.

As the slit part 310 is composed of the plurality of sub slits 310a to 310d, the first cover 300a and the second cover 300b are connected to each other via a plurality of connecting parts 320a to 320d. The respective sub slits 310a to 310d are spaced apart from each other. The respective sub slits 310a to 310d are separated from each other via the connecting parts 320a to 320d.

The first connecting part 320a is formed between the first sub slit 310a and the second sub slit 310b. The first sub slit 310a and the second sub slit 310b are separated from each other via the first connecting part 320a. The second connecting part 320b is formed between the second sub slit 310b and the third sub slit 310c. The second sub slit 310b and the third sub slit 310c are separated from each other via the second connecting part 320b. The third connecting part 320c is formed between the third sub slit 310c and the fourth sub slit 310d. The third sub slit 310c and the fourth sub slit 310d are separated from each other via the third connecting part 320c. The fourth connecting part 320d is formed between the fourth sub slit 310d and the first sub slit 310a. The fourth sub slit 310d and the first sub slit 310a are separated from each other via the fourth connecting part 320d.

Thus, if the antenna pattern 140 is in the shape of the rectangular loop, the respective sub slits 310a to 310d may be combined with each other in a rectangular shape. The respective sub slits 310a to 310d may be combined with each other in the shape of "ロ".

Furthermore, a width d1 of each of the sub slits 310a to 310d may be equal to or less than the shortest distance between the wire 140b of the antenna pattern 140 formed at the innermost position and the wire 140a thereof formed at the outermost position, The width d1 of each of the sub slits 310a to 310d may be formed to be approximately 0.3 mm or more and 4 mm or less, so that the antenna pattern 140 may be partially or entirely exposed through each of the sub slits 310a to 310d.

The rear cover and the portable terminal having the rear cover are configured such that the slit part 310 is formed in the rear cover of the portable terminal made of the metallic material, so that the rear cover of the metallic material is operated as the auxiliary radiator of the antenna pattern for near-field communication, thus improving antenna properties.

The rear cover 300 generates coupling in the area where the antenna 100 for near-field communication overlaps the slit part 310 and thereby acts as an auxiliary radiator of the antenna 100 for near-field communication.

If the antenna 100 for near-field communication is mounted to overlap the slit part 310 formed in the rear cover 300, coupling occurs in an area where the antenna pattern 300 of the antenna 100 for near-field communication overlaps the slit part 310. Thereby, the rear cover 300 made of the metallic material acts as the auxiliary radiator of the antenna 100 for near-field communication.

Figure 14:
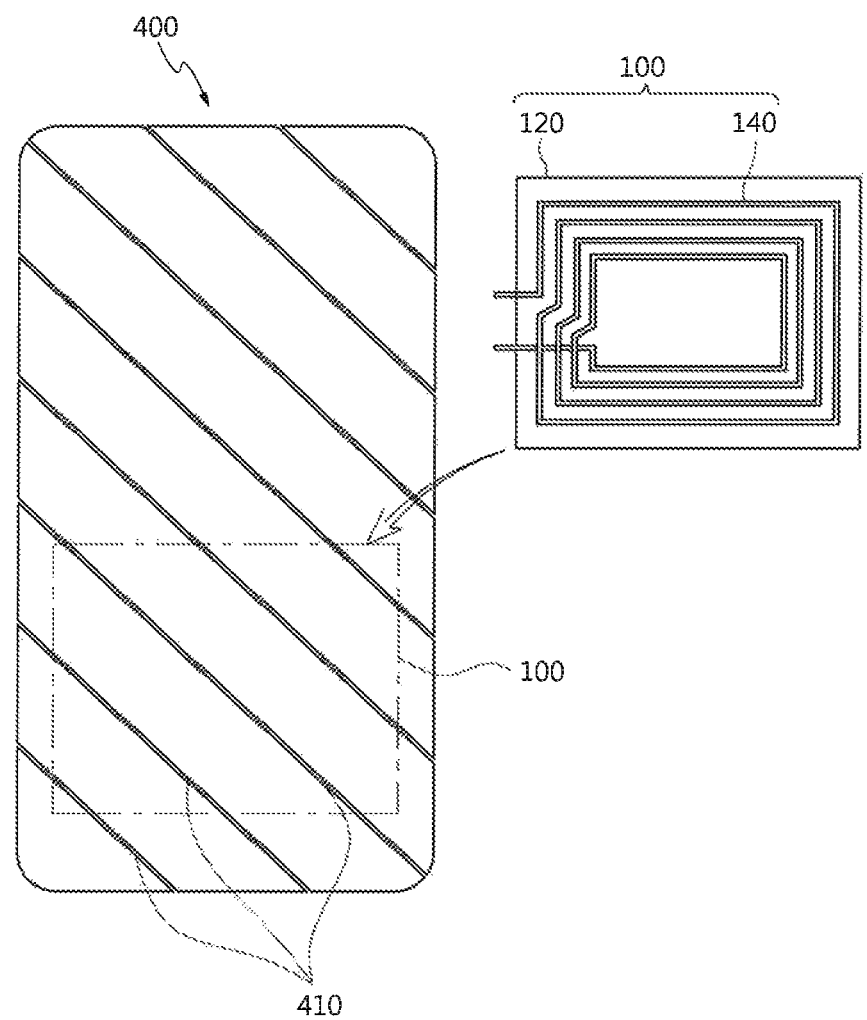
Figure 15:
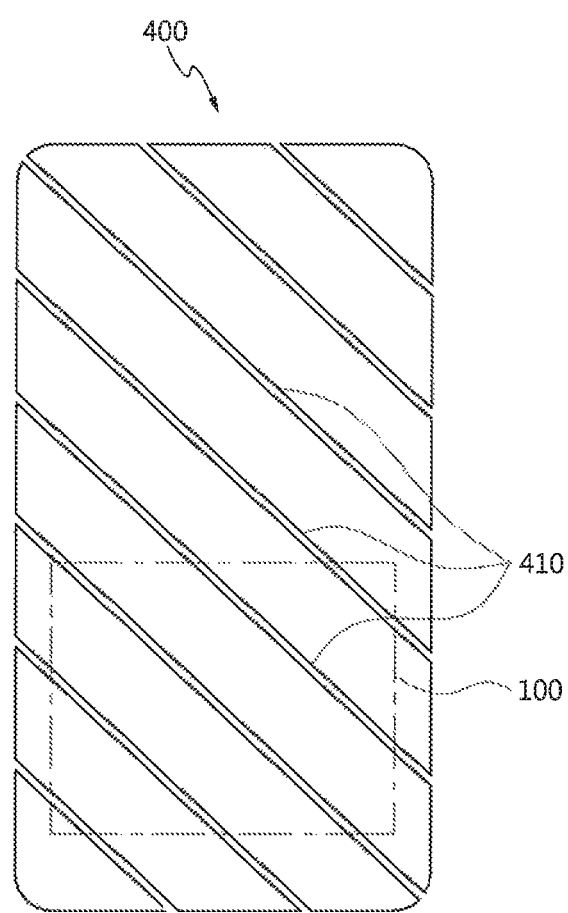
Figure 16:
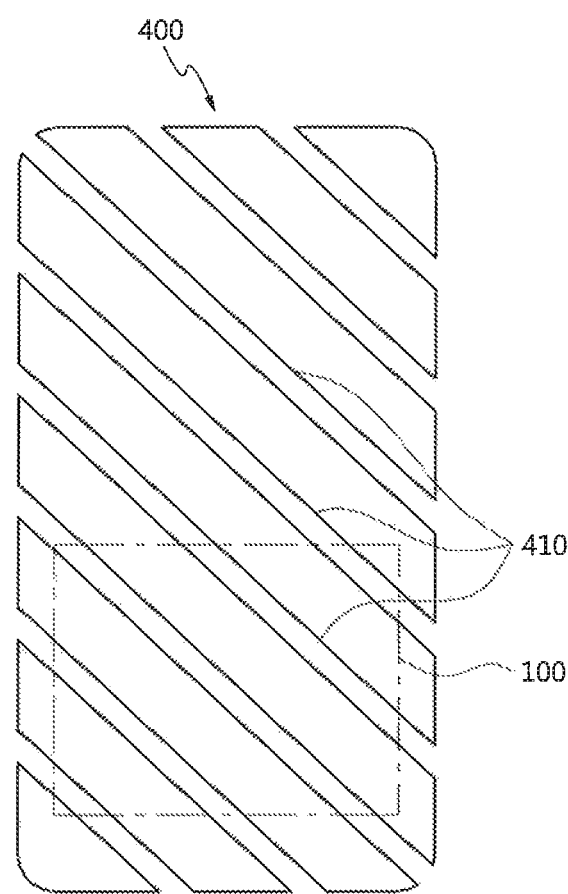

As illustrated in FIG. 14, a rear cover 400 according to a third embodiment includes a plurality of diagonal slits 410. The slits 410 may be formed to be parallel to each other. Some of the slits 410 are formed to overlap the antenna pattern 140. Each slit 410 extends from one side of the rear cover 400 to another side thereof. The rear cover 400 may be separated into a plurality of pieces by the plurality of slits 410. In this regard, the slit 410 may be formed in various widths. That is, the plurality of slits 410 may be formed in various widths, including about 1 mm (see FIG. 14), 2 mm (see FIGS. 15), and 4 mm (see FIG. 16).

Figure 17:
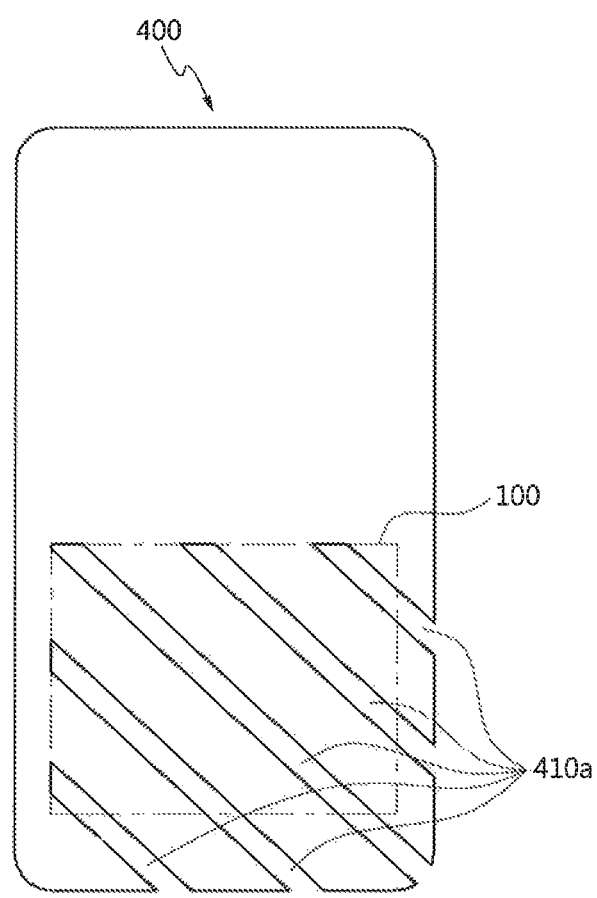

Meanwhile, as illustrated in FIG. 17, the rear cover 400 may have a plurality of slits 410a that extends from a side of the rear cover 400 to an area where the slits overlap the antenna 100 for near-field communication. Thus, this rear cover is not separated into a plurality of pieces by the plurality of slits 410a, unlike the rear cover 400 of FIG. 14.

The rear cover 400 generates coupling in the area where the antenna 100 for near-field communication overlaps the slit and thereby acts as the auxiliary radiator of the antenna 100 for near-field communication. By way of example, if the antenna 100 for near-field communication is mounted to overlap the slits 410 and 410a formed in the rear cover 400, coupling occurs in the area where the antenna pattern 140 of the antenna 100 for near-field communication overlaps the slits 410 and 410a. Thereby, the rear cover 400 made of the metallic material acts as the auxiliary radiator of the antenna 100 for near-field communication.

As described above, the present invention provides a rear cover and a portable terminal having the rear cover, in which a slit is formed in the rear cover of the portable terminal made of a metallic material, so that the rear cover of the metallic material acts as an auxiliary radiator of an antenna pattern for near-field communication, thus improving antenna properties.

Although a preferred embodiment of the present invention has been described for illustrative purposes, those skilled in the art will appreciate that various modifications, additions and substitutions are possible, without departing from the scope and spirit of the invention as disclosed in the accompanying claims.

The invention claimed is:

1. A rear cover of a portable terminal including an antenna for near-field communication, wherein the rear cover is made of a metallic material and has a slit part formed thereon, and, when the rear cover is mounted on a rear surface of the portable terminal, the antenna for near-field communication and the slit part define an overlapping area;
   wherein the slit part comprises a plurality of slits extending diagonally from a side of the rear cover;
   wherein the rear cover operates as an auxiliary radiator of the antenna for near-field communication through coupling between the rear cover and the antenna for near-field communication in the overlapping area;
   wherein a first side of each of the slits is connected to the side of the rear cover, and a second side thereof is connected to another side of the rear cover; and
   wherein the rear cover is separated into a plurality of pieces by plurality of slits.

2. The rear cover as set forth in claim 1, wherein a first side of each of the slits is connected to the side of the rear cover, and a second side thereof defines the overlapping area together with the antenna for near-field communication.

3. A portable terminal, comprising:
   a main body;
   a battery pack mounted in the main body of the portable terminal;
   a rear cover mounted on a rear surface of the main body of the portable terminal; and
   an antenna for near-field communication assembled with any one of the main body of the portable terminal, the battery pack and the rear cover,
   wherein the rear cover is made of a metallic material and has a slit part formed thereon, and, when the rear cover is mounted on a rear surface of the portable terminal, the antenna for near-field communication and the slit part define an overlapping area;
   wherein the slit part comprises a plurality of slits extending diagonally from a side of the rear cover;
   wherein the rear cover operates as an auxiliary radiator of the antenna for near-field communication through coupling between the rear cover and the antenna for near-field communication in the overlapping area;
   wherein a first side of each of the slits is connected to the side of the rear cover, and a second side thereof is connected to another side of the rear cover; and
   wherein the rear cover is separated into a plurality of pieces by the plurality of slits.

* * * * *